March 16, 1943.  G. L. WINDER  2,314,262
METHOD OF MAKING DISTENSIBLE BAG CATHETERS
Original Filed Sept. 11, 1937  2 Sheets—Sheet 1
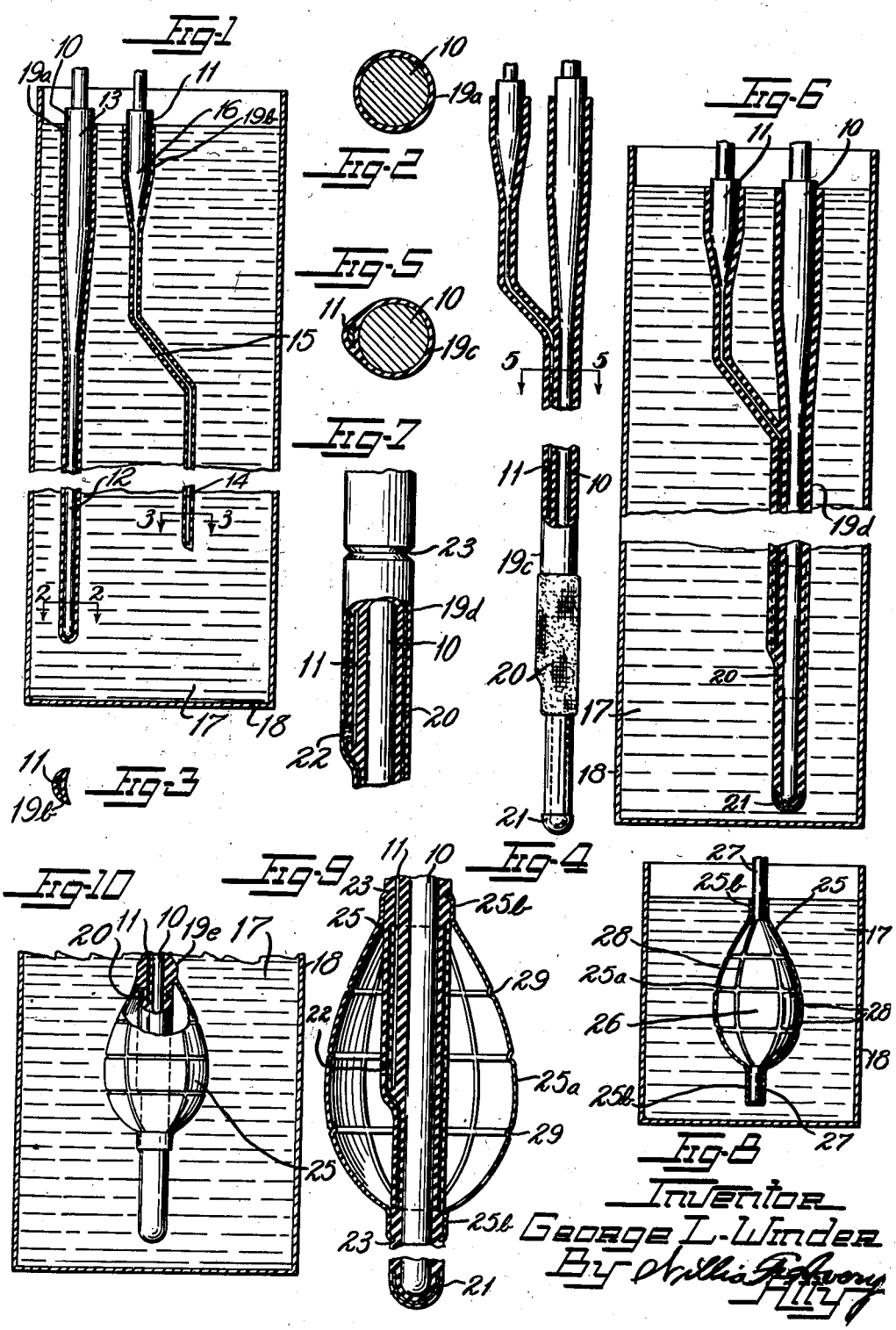

March 16, 1943. G. L. WINDER 2,314,262
METHOD OF MAKING DISTENSIBLE BAG CATHETERS
Original Filed Sept. 11, 1937 2 Sheets-Sheet 2
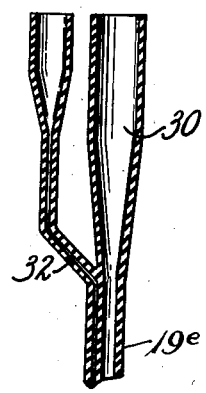
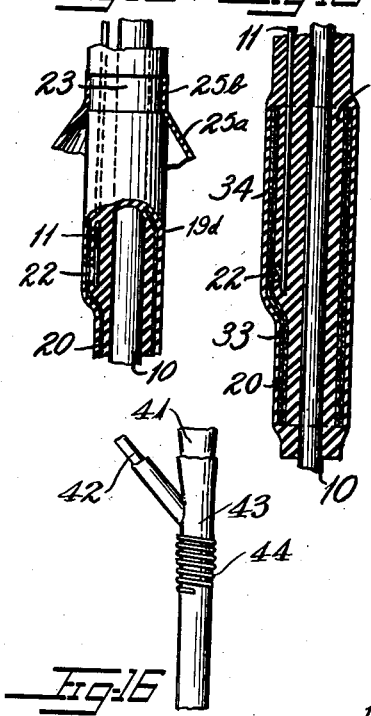
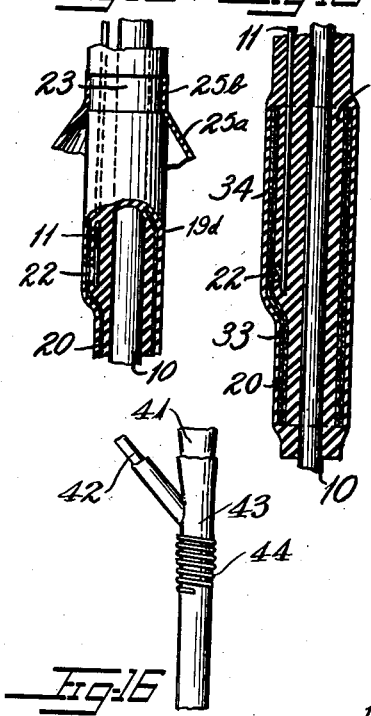
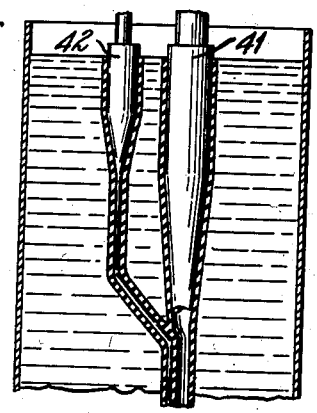
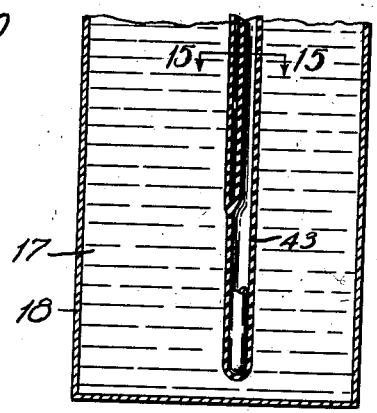
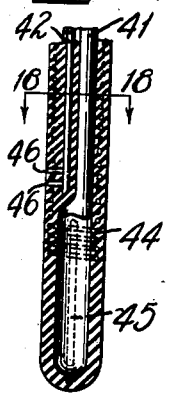
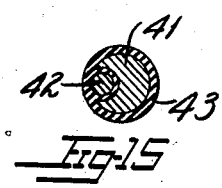
Inventor
George L. Winder Patented Mar. 16, 1943

2,314,262

UNITED STATES PATENT OFFICE 2,314,262

METHOD OF MAKING DISTENSIBLE BAG CATHETERS

George L. Winder, Cuyahoga Falls, Ohio, assignor to American Anode Inc., Akron, Ohio, a corporation of Delaware Original application September 11, 1937, Serial No. 163,422. Divided and this application August 9, 1939, Serial No. 289,242

6 Claims. (Cl. 18—58)

This invention relates to rubber surgical accessories and particularly to drainage catheters provided with distensible bags of the type especially designed for controlling hemorrhage following transurethral resection of the prostate gland and for similar purposes, as well as the so-called self-retaining distensible bag catheters, and to methods of manufacturing such accessories.

This application is a division of my co-pending application Serial No. 163,422, filed September 11, 1937.

The invention has for its major objects the provision of more satisfactory, more efficient, and more dependable distensible bag catheters, and the provision of economy and efficiency in the manufacture of such rubber articles of complicated structures. More particularly, the invention aims to provide a catheter provided with a bag which shall be more easily distensible than the bags of similar products now available; to provide a bag which shall distend uniformly in a desired shape; to provide a bag which shall distend to the required shape with minimum stretching of the rubber and consequent reduction in danger of bursting or otherwise failing in use; to provide a distensible bag catheter so constructed as to eliminate the possibility of the drainage tube collapsing under pressure from the distended bag; to provide a catheter with a separately formed and attached bag without the usual abrupt edges at the juncture of the bag with the wall of the catheter proper; to provide novel procedure for manufacturing distensible bag catheters; to provide novel procedure for attaching the distensible bag to the body of the catheter proper; to provide novel procedure for incorporating collapse-resisting reenforcements in distensible bag catheters; and to provide other novel features in construction and manufacture of distensible bag catheters.

The manner in which these and other objects of the invention are achieved will be apparent from the following description of preferred embodiments of the invention as illustrated in the accompanying drawings of which:

Fig. 1 is a sectional elevation illustrating the initial step in the process of manufacturing a distensible bag catheter according to one embodiment of the present invention and showing two deposition forms immersed in a liquid rubber composition receiving coating deposits of rubber;

Fig. 2 is a section taken on line 2—2 of Fig. 1;
Fig. 3 is a section taken on line 3—3 of Fig. 1;
Fig. 4 is an elevation, partially broken away for clarity of illustration, illustrating further steps in the process;

Fig. 5 is a section taken on line 5—5 of Fig. 4;
Fig. 6 is a sectional elevation illustrating a further step in the process and showing the assembly of Fig. 4 immersed in a liquid rubber composition receiving a coating of rubber;

Fig. 7 is a fragmentary elevation, partially broken away, showing a portion of the product of the step illustrated in Fig. 6, after further operations have been performed upon it;

Fig. 8 is a sectional elevation illustrating the step of forming the distensible bag;

Fig. 9 is a fragmentary sectional elevation illustrating the step of affixing the bag to the catheter;

Fig. 10 is a sectional elevation illustrating a further step in the process and showing the assembled catheter and bag immersed in a liquid rubber composition for receiving a finishing coating of rubber;

Fig. 11 is an elevation, partially sectioned for clarity of illustration, showing the distensible bag catheter made by the procedure illustrated in Figs. 1 to 10;

Fig. 12 is a fragmentary elevation, partially sectioned and broken away, illustrating a slight modification in the manner of affixing the distensible bag to the catheter proper as illustrated in Fig. 9;

Fig. 13 is a fragmentary sectional elevation illustrating a modified procedure in which the distensible bag is formed in situ;

Fig. 14 is a sectional elevation illustrating an early step in a modified procedure for forming a reenforced distensible bag catheter;

Fig. 15 is a section taken on line 15—15 of Fig. 14;

Fig. 16 is a fragmentary elevation illustrating a further step in the modified procedure and showing reenforcing elements in place on the product of Fig. 14;

Fig. 17 is a fragmentary sectional elevation showing a portion of the main body of a catheter made by the modified procedure ready for application of the distensible bag;

Fig. 18 is a section taken on line 18—18 of Fig. 17;

Fig. 19 is a fragmentary elevation showing the finished distensible bag catheter made by the modified procedure illustrated in Figs. 14 to 18.

As the novel features of construction embodied in the present distensible bag catheters may be most readily understood from a consideration of the procedures by which they are made, the invention will be described primarily from the procedural point of view, the structure of the product becoming evident as the description proceeds.

In manufacturing a distensible bag catheter according to one procedure illustrative of my invention, I utilize two deposition forms, a principal or drainage-tube form 10, and an auxiliary or distension-duct form 11, made of any suitable material, but preferably of a light-weight, non-corrodible metal such as aluminum. The drainage-tube form 10 consists of a relatively long rod-like portion 12 corresponding to the desired lumen size, with a gradually tapered head 13 at one end. The distension-duct form 11 consists of a straight rod-like element 14 of crescentiform cross-section having a length somewhat less than the length of the rod-like portion 12 of the form 10, and having an off-set extension 15 terminating in a gradually tapered head 16 generally like the head 13 of the form 10.

In the process, the two forms 10 and 11 are immersed to points well up on the tapered heads in a liquid rubber composition 17 contained in a suitable tank 18 (Fig. 1) and coatings of rubber 19a, 19b, each about 0.10" to 0.15" thick are deposited respectively upon the forms 10 and 11. The liquid rubber composition 17 may be a solution of rubber in a solvent such as the so-called rubber cements, or a natural or artificial aqueous dispersion of rubber, and the rubber coatings may be produced upon the forms in any desired manner. Preferably, however, the liquid rubber composition 17 should be a concentrated natural rubber latex suitably compounded with the usual vulcanizing and conditioning agents, and the deposition of the rubber coatings from such latex desirably is effected by using a coagulant preliminarly applied to the form as in U. S. Patent No. 1,908,719, and if necessary, also using a pulverulent separating material upon the forms as in U. S. Patent No. 1,924,214, to facilitate stripping the rubber deposits from the forms.

Next, the two coated forms are assembled and pressed together with the concave portion of the coated crescentiform rod 14 of the form 11 lying along the circular rod 12 of the form 10 and extending from a point about two or three inches from the tip of the form 10 to a point near the tapered portion 13, with the offset extension 15 of the form 11 projecting outward in the common plane of the assembled forms. Cohesion of the unvulcanized rubber deposits ordinarily will be sufficient to hold the assembled forms in proper relation for subsequent handling, but may be augmented if necessary by rubber cement or by thin rubber bands or the like placed around the assembly at spaced points. The assembled coated forms are then immersed again in the liquid rubber composition and an additional coating of rubber is produced upon the assembly to build up a deposit of rubber merging with the previous deposits to provide an overall coating 19c about 0.30" to 0.40" thick as most clearly shown in Fig. 5. It is also possible to mount the two forms 10 and 11 in proper spaced relation and dip them in liquid rubber composition while so mounted, and thereby to form the double-tubed rubber structure with one dipping operation.

For providing collapse-resisting reenforcement in the body of the catheter proper, when required, a piece of ordinary square-woven cotton fabric such as common "cheese cloth" 20, or other fabric, is impregnated with latex or other rubber composition and wrapped about the deposit 19c at the end of the distension duct form 11 where the distensible bag is desired, the fabric being held in place by cohesion of the latex on the fabric with the latex rubber of the deposit 19c. A single wrap of the rubberized fabric with the edges abutting provides a smooth structure and ordinarily furnishes adequate reenforcement, although several successive wraps of fabric may in some cases be desirable.

Also at this stage of the process, a tip-reenforcing metal cup 21 may be placed over the tip of the deposit to prevent puncture of the finished catheter by the stylet or sound employed in inserting the catheter through the urethra when it is used.

Thereupon the assembly is again immersed in the liquid rubber composition 17 to receive another coating of rubber which serves to enclose or embed the reenforcing fabric 20 and the metal cup 21 wholly within the rubber wall of the catheter as clearly shown in Fig. 6, the composite merged rubber deposits being designated by the numeral 19d. When the rubber deposit 19d has dried sufficiently to permit handling, a small aperture 22 is cut through the rubber 19d and the fabric 20 to expose a short length of the distension-duct form 11 at a point near the tip end, and thereby to provide communication into the duct formed in the catheter wall by the form 11. Also, shallow circumferential grooves 23, 23 are pressed or cut in the rubber 19d at spaced positions on either side of the opening 22 to receive the ends of the distensible bag flanges as will more clearly appear later.

The distensible bag itself is prepared separately by depositing a coating of rubber 25 about 0.10" thick from the liquid rubber composition 17 upon a suitable deposition form (Fig. 8) consisting of a bulbous portion 26 shaped to produce the bulbous bag 25a, and having opposed stems 27, 27 designed to form tubular flanges 25b, 25b upon the bag of a diameter adapted to fit snugly about the rubber body 19d of the catheter, the flanges of course being trimmed after the bag deposit 25 is stripped from the bag deposition form. The bulbous form 26 preferably has an unsymmetrical prolate spheroidal configuration as illustrated to produce a bag broadly termed "pear-shaped" for fitting the prostatic fossa closely. Also, the form 26 preferably is provided with series of intersecting longitudinal and circumferential surface grooves 28, 28 which produce in the wall of the distensible bag corresponding intersecting longitudinal and circumferential ribs or molded corrugations 29, 29 (depending upon the thickness of rubber deposited and whether or not the groove is filled with deposited rubber), which serve to insure uniform distension of the bag upon injection of fluid.

Upon completion of the distensible bag, the prepared catheter body 19d (Fig. 7) is inserted through the bag and the ends of the bag flanges 25b, 25b, are brought into alignment with and turned down into the grooves 23, 23, the tension in the slightly stretched rubber flanges assisting materially in this operation, and the entire assembly is again immersed in the liquid rubber composition 17 (Fig. 10) to deposit a thin film of rubber over the assembly which merges with the previous rubber deposits to form a unitary rubber deposit 19e and also serves to secure the bag firmly to the body of the catheter, and especially to produce a smooth exterior surface free of abrupt irregularities at the edges of the bag flanges, the smoothness of course being greatly increased by turning the ends of the flanges into the grooves as described. Finally, the assembled catheter is subjected to the usual washing, drying, and vulcanizing treatments, the deposition forms 10 and 11 are stripped from within the deposits, drainage eyelets are cut in appropriate positions, and the ends of the outlet tubes are trimmed, all according to the usual procedure requiring no detailed explanation.

The procedure described for attaching the distensible bag to the body of the catheter may advantageously be modified by making the grooves 23, 23 wide enough to receive the entire respective flanges 25b, 25b, as illustrated in Fig. 12, thereby further contributing to a smooth exterior surface.

The finished catheter made by the process described, as illustrated in Fig. 11, is seen to consist of a principal drainage tube 30 having drainage eyelets 31, 31 at the distal end, a distensible bag 25 surrounding the main body of the catheter adjacent the eyelets, with an auxiliary or distension duct 32 leading into and through the integral body of the catheter to the distensible bag, whereby the bag may be distended by injecting fluid through the duct. The distensible bag is pre-formed with a bulbous "pear" shape so that minimum stretching of the rubber bag and minimum distending pressure will be necessary for fitting the bag closely to the prostatic fossa, uneven distension of the bag being minimized by the ribs or molded corrugations 29, 29. Although the bag is formed separately and affixed to the body of the catheter, a smooth exterior surface is nevertheless presented, thereby overcoming a serious defect in the usual type of assembled bag catheter. Other advantages of the product are apparent.

For causing the catheter, or a desired local portion of the catheter, to show up more clearly in an X-ray photograph of a patient, the liquid rubber composition from which the catheter or the local portion thereof is formed may be compounded with a suitable shadow-producing material. For example, the addition of 20% of blanc fixe (based on the rubber content) to latex, will produce a rubber article capable of casting a clearly defined shadow under X-rays. Other materials which block the travel of X-rays may be substituted for the blanc fixe.

In a modified procedure, the distensible bag may be formed in situ by treating the local circumferential area of the catheter body where the bag is desired with a substance adapted to prevent adhesion in that area of a subsequently applied deposit of rubber. For example, a local circumferential area or surface band of the rubber body of the catheter including the opening 22, may be treated with a separating material such as a suspension of soapstone in alcohol, or with a chemical such as bromine, chlorine, or sulfur chloride, in a suitable solvent, to prevent adhesion of the subsequently applied rubber deposit, and then immersed in a liquid rubber composition to produce the final coating of rubber forming the distensible bag in situ over the treated area. When a collapse-resisting fabric reinforcement is embodied in the catheter, it has been found advantageous not to embed the fabric in the body of the catheter as heretofore described, but to wrap the rubberized fabric reinforcement 20 about the body of the catheter after it is complete except for the bag-forming deposit of rubber and to utilize the fabric for retaining pulverulent separating material upon the catheter body. Referring particularly to Fig. 13, the catheter body designated 19f is produced in the manner described upon the deposition forms 10 and 11. The rubberized fabric reenforcement 20 is then wrapped about the body 19f at the tip end of the form 11, and an opening 22 is made through the fabric and rubber to expose a short length of the form 11 and provide communication into the distension duct. The fabric 20 is then preferably treated as by brushing thereon an appropriate quantity of a syrupy coating composition containing 60 grams of soapstone suspended in one liter of acetone or alcohol containing 500 grams of a latex coagulant such as calcium nitrate or zinc nitrate, thereby producing, after the alcohol or acetone has evaporated, a separating layer 33 upon the fabric and in the opening 22. The assembly is then dipped in latex and a final coating of rubber is produced thereon adhering to the body 19f except over the treated fabric where a circumferential layer of rubber 34 is produced forming an integral bag which may be distended by injecting fluid through the distension duct, the pulverulent separating material in the opening 22 of course being easily displaced by the distending fluid.

In a further modified embodiment of the invention (Figs. 14 to 19), a coil wire reenforcement is utilized which necessitates a circular cross-section in the main body of the catheter. I therefore utilize a principal or drainage tube form 41 having a longitudinal groove extending along the form from a point about two or three inches from the tip end to a point near the enlarged head, together with a rod-like auxiliary or distension-duct form 42 having a circular cross-section adapted to fit in the groove in the principal form. The two forms are coated with rubber in the manner described, the coated auxiliary form is placed in the groove of the coated principal form, and the assembly is coated with rubber (Fig. 14) to build up an integral deposit of rubber 43 about half the thickness desired in the wall of the catheter. Next, a coil wire reenforcing element 44, is placed over the tubular portion of the deposit 43, and a U shaped tip-reenforcing wire element 45 is placed over the tip of the deposit with the legs of the U extending to and being mechanically engaged with the coil reenforcing element 44 (Fig. 16). The coil reenforcing element 44 may be formed of about 0.007 inch gauge stainless steel wire and should have a low pitch of about 20 coils to the inch. The coil element preferably extends from a point between the position (in the finished catheter) of the drainage eyelets and the distal end of the bag to a point adjacent the convergence of the drainage tube and the distension duct but may be restricted to a portion only of the length of the catheter, as for example merely the length covered by the distensible bag.

When the wire reenforcing elements 44 and 45 have been properly positioned, the assembly is immersed in the liquid rubber composition 17 and a deposit of rubber of sufficient thickness to cover the wire is produced thereon to embed the wire completely within the wall of the catheter. Small openings 46, 46 then are cut in the catheter wall to provide communication into the distension duct near the tip end of the distension duct near the tip end of the distension duct form 42, and a distensible bag 47 is affixed to the catheter over the openings 46, in the manner described. To complete the catheter, the forms 41, 42 are removed, drainage eyelets 48 are cut adjacent the tip, the open ends of the drainage tube and the distension duct are trimmed, and the rubber is washed, dried, and vulcanized as before.

As will be noted, the distensible bag 47 is formed with a "pear-shaped" configuration for fitting the prostatic fossa, and that it also is formed with longitudinal flutes or folds 49 to facilitate easy and uniform distension of the bag, while maintaining minimum size of the undistended bag for easy passage through the urethra. The coil wire reenforcing element 44 effectively prevents collapse of the drainage tube under collapsing pressure, and even when the tube is bent sharply, while the U shaped tip reenforcement 45 imparts rigidity to the tip and facilitates passage through the urethra. Other advantages of the embodiment of Fig. 11 of course are inherent in the modified embodiment of Fig. 19.

It therefore appears that the invention as described attains to a high degree the objects hereinabove set forth.

The various specific features of construction and procedure described in connection with the several different embodiments of the invention of course may be interchanged and combined in many obvious ways, and the invention is by no means restricted to the particular combinations of features illustrated and described. Also numerous modifications and variations in details of operative procedure and materials herein described may be made without departing from the spirit and scope of the invention as defined by the appended claims.

I claim:

1. A method of making a distensible bag catheter or similar article, which comprises producing a tubular rubber structure having at least two independent and substantially parallel passageways with one of said passageways opening through the tubular wall at a point between the ends thereof, associating a collapse-resisting reenforcement with the tubular structure in the region of said opening, separately providing a bulbous distensible bag having opposed tubular flanges, circumferentially grooving the tubular structure at spaced points on either side of said opening, placing the bag on the tubular structure with the flanges associated with the respective grooves, and coating the assembly with rubber to provide a relatively smooth exterior surface.

2. A method of making a surgical appliance, which comprises forming a rubber tube, separately forming a rubber bag provided with opposed tubular flanges, circumferentially grooving the rubber tube at spaced points, placing the bag on the tube with the flanges associated with the respective grooves, and coating the assembly with rubber to provide a relatively smooth exterior surface.

3. The method of making an integral tubular rubber structure such as a catheter having a relatively large passageway and a relatively small passageway parallel thereto, which comprises applying a coating of rubber to a main rod-like form of relatively large circular cross-section, applying a coating of rubber to a second rod-like form of relatively small crescentiform cross-section, assembling the coated forms in parallel relation with the concave face of the coated second form adjacent the coated main form, and coating the assembled forms with rubber.

4. A method of making a surgical appliance or similar article, which comprises forming a rubber tube having relatively thick walls, separately forming a shorter tubular rubber element having relatively thin walls, providing two circumferential grooves at spaced-apart positions in the exterior surface of the thick-walled tube, mounting the thin-walled tubular element concentrically on the thick-walled tube with the ends of the thin-walled element lying respectively in the said grooves, and applying a coating of rubber to a substantial part of the exterior surface of the assembly including the zones about the ends of the thin-walled member lying in said grooves.

5. A method of making a distensible bag catheter or similar article, which comprises producing a tubular rubber structure having relatively thick walls and including at least two independent and substantially parallel passageways, providing an opening in the wall communicating with one of said passageways, separately forming a tubular rubber element of shorter length than the thick-walled structure and having relatively thin walls, mounting the thin-walled member concentrically about the thick-walled member so that the thin-walled member covers the said communicating opening and the thick-walled member projects from each end of the thin-walled tubular member, and applying a coating of rubber to a substantial part of the exterior surface of the assembly including the zones about the ends of the thin-walled member.

6. The method of forming a rubber article having an inflatable balloon, comprising the steps of dipping a cylindrical form in rubber solution, forming an opening through the dipped coat for passage of an inflation fluid, treating the surface of the dipped coat about the opening to prevent adhesion, positioning an inflatable sleeve over the treated area, and again dipping to obtain an outer coat integral with the initial dipped coat and having the sleeve integrally locked thereto.

GEORGE L. WINDER.